United States Patent
Schwarz et al.

(10) Patent No.: US 11,711,535 B2
(45) Date of Patent: Jul. 25, 2023

(54) VIDEO-BASED POINT CLOUD COMPRESSION MODEL TO WORLD SIGNALING INFORMATION

(71) Applicant: Nokia Technologies Oy, Espoo (FI)

(72) Inventors: Sebastian Schwarz, Unterhaching (DE); Lukasz Kondrad, Munich (DE); Kimmo Roimela, Tampere (FI); Lauri Ilola, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/022,188

(22) Filed: Sep. 16, 2020

(65) Prior Publication Data
US 2021/0092430 A1  Mar. 25, 2021

Related U.S. Application Data
(60) Provisional application No. 62/902,511, filed on Sep. 19, 2019.

(51) Int. Cl.
*H04N 19/503* (2014.01)
*H04N 19/176* (2014.01)
(Continued)

(52) U.S. Cl.
CPC ............. *H04N 19/503* (2014.11); *G06T 7/10* (2017.01); *H04N 19/176* (2014.11);
(Continued)

(58) Field of Classification Search
CPC . G06T 2207/10016; G06T 2207/10028; G06T 7/10; G06T 9/00; H04N 19/176; H04N 19/46; H04N 19/503; H04N 19/597
See application file for complete search history.

(56) References Cited

U.S. PATENT DOCUMENTS

2019/0139266 A1   5/2019  Budagavi et al.
2019/0313110 A1*  10/2019  Mammou ............ H04N 19/597
(Continued)

FOREIGN PATENT DOCUMENTS

| WO | WO-2019/034807 A1 | 2/2019 |
| WO | WO-2019158821 A1  | 8/2019 |
| WO | WO-2019/166688 A1 | 9/2019 |

OTHER PUBLICATIONS

Wang, Xin, et al., "Signaling 6DoF Coordinates of V-PCC Sub-Point Clouds (Tiles) in V-PCC Bit-Streams", Media Tek USA, Inc., ISO/IEC JTC1/SC29/WG11 MPEG2019/m49357, Jul. 2019, 4 pgs.
(Continued)

*Primary Examiner* — Md N Haque
(74) *Attorney, Agent, or Firm* — Joseph C. Drish; Harrington & Smith

(57) ABSTRACT

Apparatuses, methods, and computer programs are disclosed to implement video-based cloud compression model to world signaling. An example apparatus includes at least one processor; and at least one non-transitory memory including computer program code; wherein the at least one memory and the computer program code are configured to, with the at least one processor, cause the apparatus at least to perform: provide first signaling information comprising information related to a world domain, wherein the world domain is a point cloud frame that is represented by a number of points in a first volumetric coordinate system; and provide second signaling information comprising information related to a conversion of a model domain to the world domain, wherein the model domain represents the point cloud frame by a number of points in a second volumetric coordinate system.

15 Claims, 11 Drawing Sheets

(51) Int. Cl.
H04N 19/597 (2014.01)
G06T 7/10 (2017.01)

(52) U.S. Cl.
CPC .. H04N 19/597 (2014.11); *G06T 2207/10016* (2013.01); *G06T 2207/10028* (2013.01)

(56) References Cited

U.S. PATENT DOCUMENTS

| | | | |
|---|---|---|---|
| 2020/0005518 A1* | 1/2020 | Graziosi | G06T 15/04 |
| 2020/0021847 A1* | 1/2020 | Kim | H04N 19/17 |
| 2020/0151913 A1* | 5/2020 | Budagavi | H04N 19/503 |
| 2020/0302571 A1* | 9/2020 | Schwarz | G06T 3/0031 |

OTHER PUBLICATIONS

ISO/IEC CD 23090-5 Video-based Point Cloud Compression, MPEG document N18479, MPEG document management system [online], May 8, 2019, [retrieved on Feb. 1, 2021], Retrieved from https://dms.mpeg.expert, sections 3.13, 3.21, 7.3.1, 7.4.5, 9.4, 140 pgs.

"Technicolor Point Cloud Renderer—PccAppRenderer" Apr. 16, 2018 [retrieved on Feb. 1, 2021], https://dms.mpeg.expert/doc_end_user/documents/122_San%20Diego/wg11/m42789-vl-m42789-PccAppRenderer2.0.zip; 16 pgs.

Kimmo Roimela, Sebastian Schwarz, Mike Pesonen "Model Scale and Offset Signaling for PCC" Nokia Technologies ISO/IECJTC1/SC29/WG11 MPEG2018/M42470, San Diego, USA, Apr. 2018.

Lukasz Kondrad, Lauri Ilola, Kimmo Roimela, Sebastian Schwarz "Splitting SEI Messages" Nokia Technologies ISO/IECJTC1/SC29/WG11 MPEG2018/M50827, Geneva, Switzerland, Oct. 2019.

* cited by examiner

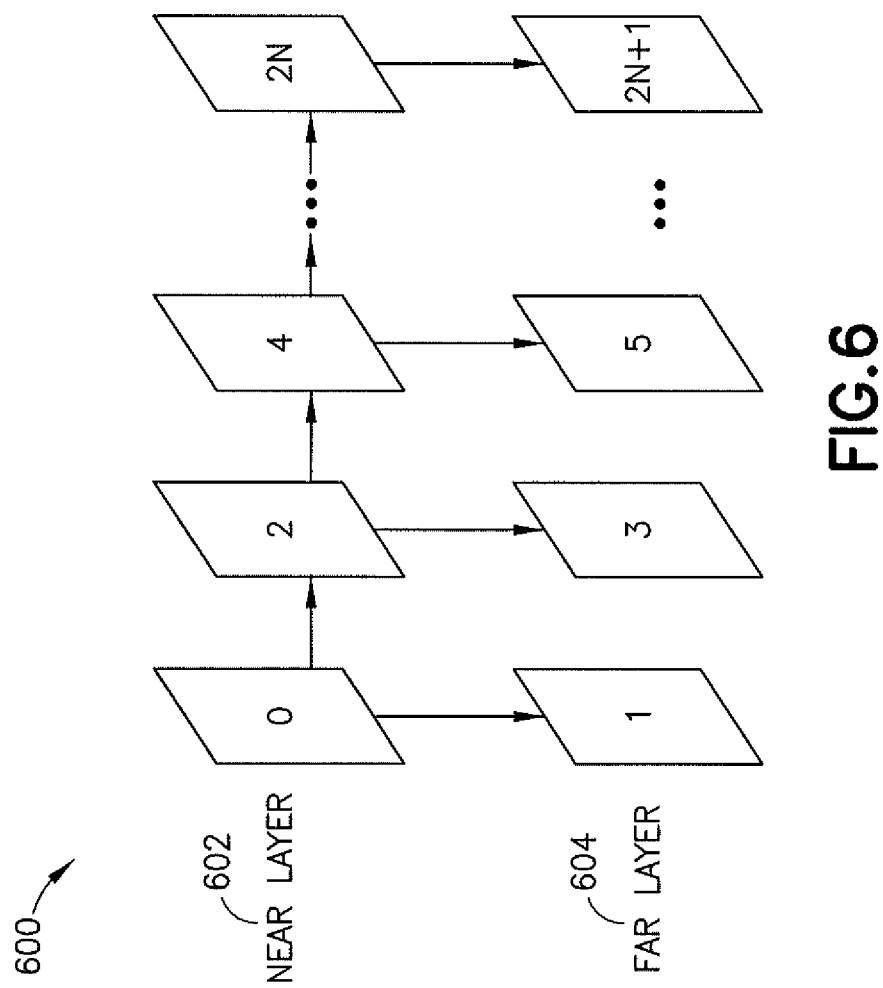

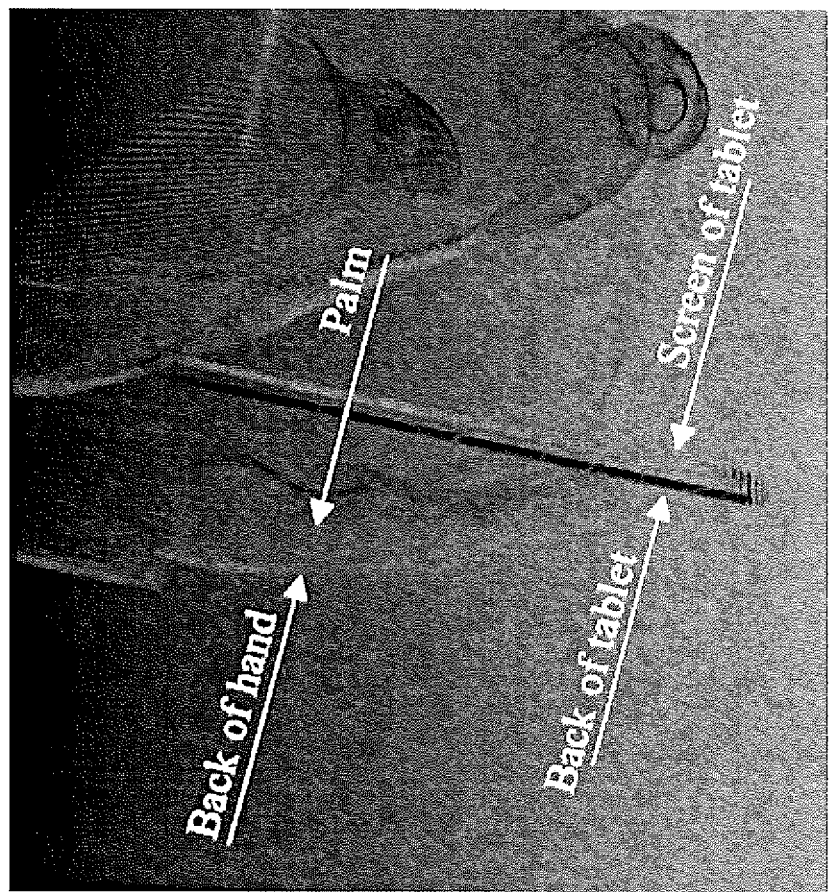

VIDEO-BASED POINT CLOUD COMPRESSION MODEL TO WORLD SIGNALING INFORMATION

RELATED APPLICATION

This application claims priority to U.S. Provisional Application No. 62/902,511, filed Sep. 19, 2019, which is hereby incorporated by reference in its entirety.

TECHNICAL FIELD

The examples and non-limiting embodiments relate generally to multimedia and software, and more particularly, to video-based cloud compression model to world signaling information.

BACKGROUND

It is known to perform video coding and decoding.

SUMMARY

The following summary is merely intended to be an example. The summary is not intended to limit the scope of the claims.

In accordance with an aspect, an apparatus includes at least one processor; and at least one non-transitory memory including computer program code; wherein the at least one memory and the computer program code are configured to, with the at least one processor, cause the apparatus at least to perform: provide first signaling information comprising information related to a world domain, wherein the world domain is a point cloud frame that is represented by a number of points in a first volumetric coordinate system; and provide second signaling information comprising information related to a conversion of a model domain to the world domain, wherein the model domain represents the point cloud frame by a number of points in a second volumetric coordinate system.

In accordance with an aspect, a method includes providing first signaling information comprising information related to a world domain, wherein the world domain is a point cloud frame that is represented by a number of points in a first volumetric coordinate system; and providing second signaling information comprising information related to a conversion of a model domain to the world domain, wherein the model domain represents the point cloud frame by a number of points in a second volumetric coordinate system.

In accordance with an aspect, a non-transitory program storage device readable by a machine, tangibly embodying a program of instructions executable by the machine for performing operations may be provided, the operations comprising: providing first signaling information comprising information related to a world domain, wherein the world domain is a point cloud frame that is represented by a number of points in a first volumetric coordinate system; and providing second signaling information comprising information related to a conversion of a model domain to the world domain, wherein the model domain represents the point cloud frame by a number of points in a second volumetric coordinate system.

BRIEF DESCRIPTION OF THE DRAWINGS

The foregoing aspects and other features are explained in the following description, taken in connection with the accompanying drawings, wherein:

FIG. 6 illustrates an example of layer projection structure.

FIG. 7 is an illustration showing stacked surface patch separation.

DETAILED DESCRIPTION OF EXAMPLE EMBODIMENTS

Figure 1:
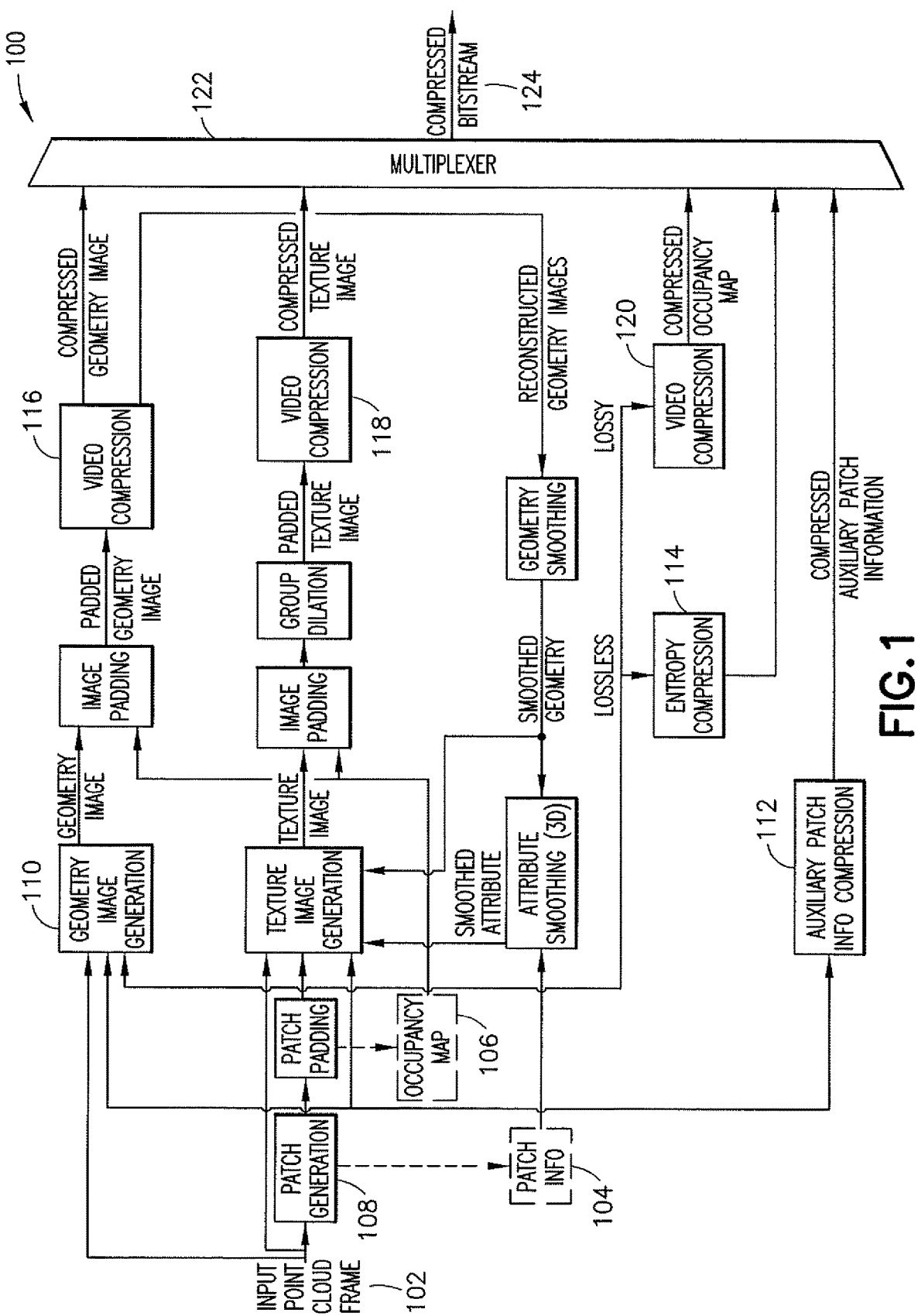
FIG. 1 is a block diagram depicting an overview of the video-based point cloud compression (V-PCC) process.

The following acronyms and abbreviations that may be found in the specification and/or the drawing figures are defined as follows:

2D or 2d two-dimensional
3D or 3d three-dimensional
6DOF six degrees of freedom
AR augmented reality
AVC advanced video coding
CD context description
codec coder-decoder
CGI computer-generated imagery
GI geometry information
HEVC high efficiency video coding
HEVC RExt HEVC format range extension
HEVC-SCC HEVC screen content coding
HM HEVC test model
IEC International Electrotechnical Commission
ISO International Organization for Standardization
ISOBMFF ISO base media file format
K-D k-dimensional
MPEG moving picture experts group
MPEG-I MPEG immersive
MR mixed reality
MSE mean squared error
N# International Organization for Standardization document number
OM occupancy map
PCC point cloud coding/compression
pcm pulse code modulation
psd power spectral density
RGB red green blue
SEI supplemental enhancement information
sps sequence parameter set
TMC2 text model category 2
TMC2v0 text model category 2 version 0
V-PCC video-based point cloud coding/compression
VR virtual reality
WxH width by height The examples described herein relate to the encoding and decoding of digital volumetric video.

Volumetric video data. Volumetric video data represents a three-dimensional scene or object and may be used as input for AR, VR and MR applications. Such data describes geometry (shape, size, position in 3D-space) and respective attributes (e.g. color, opacity, reflectance, . . . ), plus any possible temporal changes of the geometry and attributes at given time instances (like frames in 2D video). Volumetric video is either generated from 3D models, i.e. CGI, or captured from real-world scenes using a variety of capture solutions, e.g. multi-camera, laser scan, combination of video and dedicated depth sensors, and more. Also, a combination of CGI and real-world data is possible. Typical representation formats for such volumetric data are triangle meshes, point clouds, or voxel. Temporal information about the scene may be included in the form of individual capture instances, i.e. "frames" in 2D video, or other means, e.g. position of an object as a function of time.

Because volumetric video describes a 3D scene (or object), such data can be viewed from any viewpoint. Therefore, volumetric video is an important format for any AR, VR, or MR application, especially for providing 6DOF viewing capabilities.

Increasing computational resources and advances in 3D data acquisition devices have enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications such as capturing real world 3D scenes where the topology is not necessarily a 2D manifold. Another way to represent 3D data is coding this 3D data as a set of texture and depth maps as is the case in multi-view plus depth. Closely related to the techniques used in multi-view plus depth is the use of elevation maps, and multi-level surface maps.

Compression of volumetric video data. In dense point clouds or voxel arrays, the reconstructed 3D scene may contain tens or even hundreds of millions of points. If such representations are to be stored or interchanged between entities, then efficient compression becomes essential. Standard volumetric video representation formats, such as point clouds, meshes, voxel, suffer from poor temporal compression performance. Identifying correspondences for motion-compensation in 3D-space is an ill-defined problem, as both geometry and respective attributes may change. For example, temporal successive "frames" do not necessarily have the same number of meshes, points or voxel. Therefore, compression of dynamic 3D scenes is inefficient. 2D-video based approaches for compressing volumetric data, i.e. multiview+depth, have much better compression efficiency, but rarely cover the full scene. Therefore, they provide only limited 6DOF capabilities.

Instead of the above-mentioned approaches, a 3D scene, represented as meshes, points, and/or voxel, may be projected onto one, or more, geometries. These geometries are "unfolded" onto 2D planes (two planes per geometry: one for texture, one for depth), which are then encoded using standard 2D video compression technologies. Relevant projection geometry information is transmitted alongside the encoded video files to the decoder. The decoder decodes the video and performs the inverse projection to regenerate the 3D scene in any desired representation format (not necessarily the starting format).

Projecting volumetric models onto 2D planes allows for using standard 2D video coding tools with highly efficient temporal compression. Thus, coding efficiency is increased greatly. Using geometry-projections instead of prior-art 2D-video based approaches, i.e. multiview+depth, provide a better coverage of the scene (or object). Thus, 6DOF capabilities are improved. Using several geometries for individual objects improves the coverage of the scene further. Furthermore, standard video encoding hardware may be utilized for real-time compression/decompression of the projected planes. The projection and reverse projection steps are of low complexity.

Figure 2:
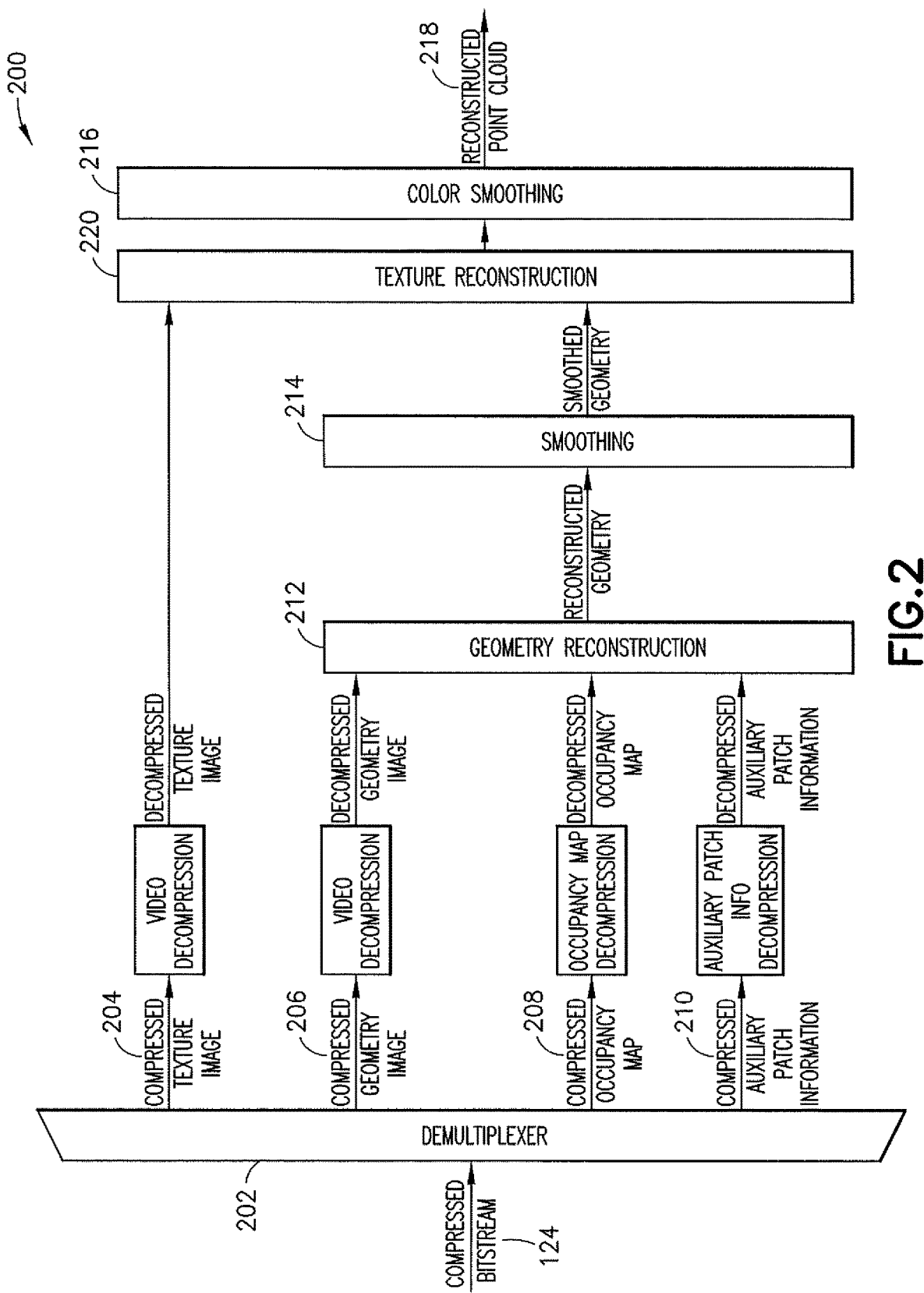
FIG. 2 is a block diagram depicting an overview of the V-PCC decompression process.

MPEG Video-Based Point Cloud Coding (V-PCC) Test Model (MPEG N18017). For purposes of clarification, certain selected excerpts of MPEG document N18017 are provided. FIG. 1 and FIG. 2 provide an overview of the compression/decompression processes implemented in V-PCC TMC2. In particular, FIG. 1 is a block diagram 100 depicting an overview of the video-based point cloud compression (V-PCC) compression process, and FIG. 2 is a block diagram 200 depicting an overview of the V-PCC decompression process.

At the encoding stage an input point cloud frame is processed in the following manner: first the volumetric 3d data is represented as a set of 3d projections in different components. At the separation stage the image is decomposed into far and near components for geometry and corresponding attributes components, in addition an occupancy map 2d image is created (106) to indicate parts of an image that may be used. The 2d projection is composed of independent patches (104) based on geometry characteristics of the input point cloud frame (102). After the patches (104) have been generated (108) and 2d frames for video encoding were created the occupancy map (106), geometry information (110) and the auxiliary information may be compressed (112, 114, 116, 118, 120). At the end of the process the separate bit streams are multiplexed (122) into the output compressed binary file (124).

The decoding process starts from demultiplexing (202) of the input compressed into the binary file (124) into geometry (206), attribute (204), occupancy map (208) and auxiliary information (210) streams. The auxiliary information stream (210) is entropy coded (the detailed description of coding methods for auxiliary information compression is provided in MPEG N18017). The occupancy map may be compressed using an entropy coding method, or video compression method depending on a selected level. The geometry stream is decoded (212) and in combination with the occupancy map and auxiliary information, smoothing (214, 216) is applied to reconstruct point cloud geometry information (218). Based on the decoded attribute video stream (220) and reconstructed information for smoothed geometry (212 and 214), occupancy map and auxiliary information attributes of the point cloud may be reconstructed (218). After the attribute reconstruction stage an additional attribute smoothing method is used for point cloud refinement.

Thus, the block structure diagram 100 shown in FIG. 1 is used for encoding while for decoding the block structure diagram 200 in FIG. 2 is used.

Figure 3:
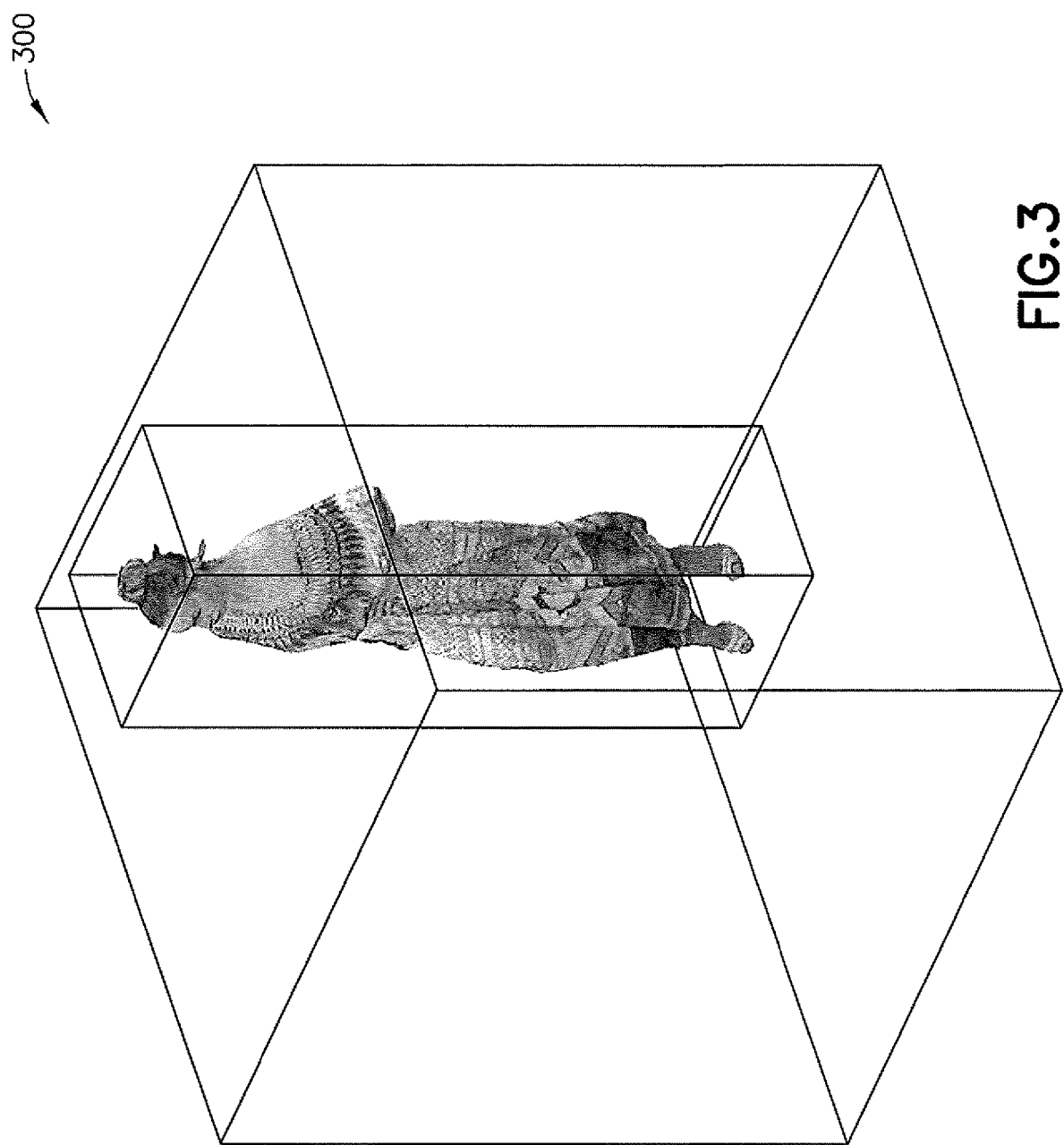
FIG. 3 depicts an example point cloud sample image (1 frame).

Point Cloud Representation in V-PCC. Each point cloud frame represents a dataset of points within a 3D volumetric space that has unique coordinates and attributes. An example of a point cloud frame 300 is shown in FIG. 3.

Patch Generation. The patch generation process decomposes the point cloud frame by converting 3d samples to 2d samples on a given projection plane using a strategy that provides the best compression. In TMC2v0, the patch generation process aims at decomposing the point cloud into a minimum number of patches with smooth boundaries, while also minimizing reconstruction error.

At the initial stage, a normal per each point is estimated. The tangent plane and its corresponding normal are defined per each point, based on the point's nearest neighbors m within a predefined search distance. A K-D tree is used to separate the data and find neighbors in a vicinity of a point $p_i$ and a barycenter $c=\bar{p}$ of that set of points is used to define the normal. The barycenter c is computed as follows:

$$c = p = \frac{1}{m}\sum_{i=1}^{m} p_i \quad (1)$$

The normal is estimated from an eigen decomposition for the defined point cloud as:

$$\Sigma_{i=1}^{m}(p_i-\bar{p})(p_i-\bar{p})^T \quad (2)$$

Based on this information each point is associated with a corresponding plane of a point cloud bounding box. Each plane is defined by a corresponding normal $\vec{n}_{P_{idx}}$, with values:
- (1.0, 0.0, 0.0),
- (0.0, 1.0, 0.0),
- (0.0, 0.0, 1.0),
- (−1.0, 0.0, 0.0),
- (0.0, −1.0, 0.0),
- (0.0, 0.0, −1.0).

More precisely, each point is associated with the plane that has the closest normal (i.e., maximizes the dot product of the point normal $\vec{n}_{p_i}$ and the plane normal $\vec{n}_{P_{idx}}$).

$$\max_{P_{idx}}\{\vec{n}_{p_i} \cdot \vec{n}_{P_{idx}}\} \quad (3)$$

Figure 4:
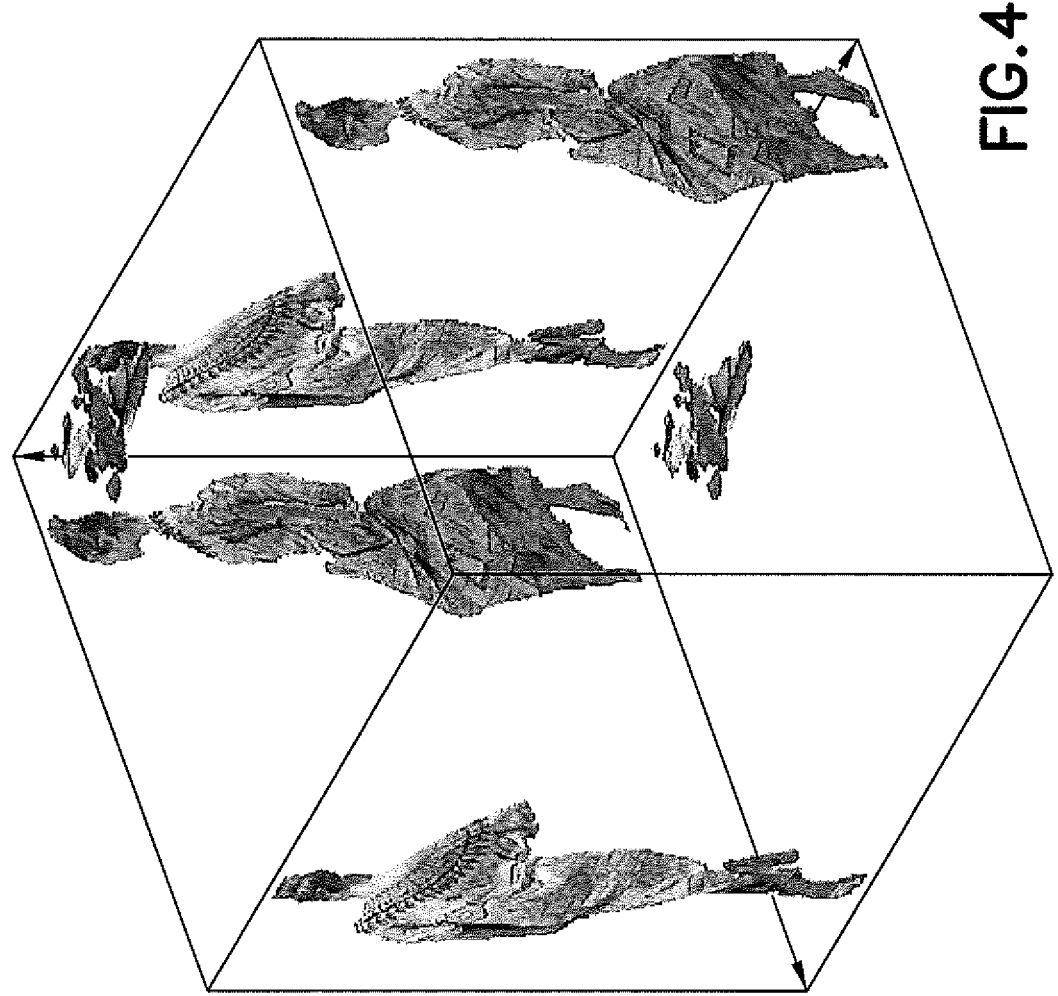
FIG. 4 is an illustration depicting an example point cloud projected onto "bounded-box" planes.

The sign of the normal is defined depending on the point's position in relationship to the "center". The projection estimation description is demonstrated in FIG. 4. FIG. 4 is an illustration 400 depicting an example point cloud projected onto "bounded-box" planes.

The initial clustering is then refined by iteratively updating the clustered index associated with each point based on the point's normal and the cluster indices of the point's nearest neighbors. The next step consists of extracting patches by applying a connected component extraction procedure.

Patch Packing. The patch packing process tries to generate the geometry and texture maps, by appropriately considering the generated patches and by trying to efficiently place the geometry or texture data that correspond to each patch onto a 2D grid of size W×H. Such placement also accounts for a used-defined minimum size block T×T, which specifies the minimum distance between distinct patches as placed on this 2D grid. The corresponding value (T) is encoded and sent to the decoder.

Figure 5B:
FIG. 5B depicts an example of texture images.
Figure 5A:
FIG. 5A depicts an example of projected geometry.

FIG. 5A depicts an example 500 of projected geometry, and FIG. 5B depicts an example 550 of texture images.

The packing method in TMC2 uses an exhaustive search algorithm as follows: initially, patches are placed on a 2D grid in a manner that would guarantee non-overlapping insertion. Samples belonging to a patch (rounded to a value that is a multiple of T) are considered as occupied blocks. In addition, a safeguard between adjacent patches is forced to a distance of at least one block being a multiple of T. Patches are processed in an orderly manner, based on the patch index list. Each patch from the list is iteratively placed on the grid. The grid resolution depends on the original point cloud size and its width (W) and height (H) are transmitted to the decoder. In the case that there is no empty space available for the next patch the height value of the grid is initially doubled, and the insertion of this patch is evaluated again. If insertion of all patches is successful, then the height is trimmed to the minimum needed value. However, this value is not allowed to be set lower than the originally specified value in the encoder. The final values for W and H correspond to the frame resolution that is used to encode the texture and geometry video signals using the appropriate video codec.

Image Generation. The image generation process exploits the 3D to 2D mapping computed during the packing process to store the geometry and texture of the point cloud as images. In order to better handle the case of multiple points being projected to the same sample, each patch is projected onto two images, referred to as layers. More precisely, let H(u,v) be the set of points of the current patch that get projected to the same sample (u, v).

FIG. 6 illustrates an example of layer projection structure 600. The first layer, also called the near layer 602, stores the point of H(u,v) with the lowest depth D0. The second layer, referred to as the far layer 604, captures the point of H(u,v) with the highest depth within the interval [D0, D0+Δ], where Δ is a user-defined parameter that describes the surface thickness.

The surface separation method is applied to prevent the mixing of different surfaces in the connected components when there is a stack of multiple different surfaces in that connected component. One of the methods to separate surfaces is to use differences of MSE values of points in the RGB color domain: Separate patch if, $MSE(R_1-R_2,G_1-G_2,B_1-B_2)$>Threshold; Threshold=20 where $R_1$, $G_1$, $B_1$ are attribute values belonging to T0 and $R_2$, $G_2$, $B_2$ are the attribute values belonging to T1.

FIG. 7 is an illustration 700 showing stacked surface patch separation. Note that the example geometry video is monochromatic.

Padding. The padding process aims at filling the empty space between patches in order to generate a piecewise smooth image suited for video compression. The following method is used:
- Each block of T×T (e.g., 16×16) pixels is processed independently.
- If the block is empty (i.e., all its pixels belong to empty space), then the pixels of the block are filled by copying either the last row or column of the previous T×T block in raster order.
- If the block is full (i.e., no empty pixels), nothing is done.
- If the block has both empty and filled pixels, then the empty pixels are iteratively filled with the average value of their non-empty neighbors.

Video compression. The generated images/layers are stored as video frames and compressed using the HM16.16 video codec according to the HM configurations provided as parameters.

Auxiliary patch information. The following meta data is encoded/decoded for every patch:
- Index of the projection plane
  - Index 0 for the planes (1.0, 0.0, 0.0) and (−1.0, 0.0, 0.0)
  - Index 1 for the planes (0.0, 1.0, 0.0) and (0.0, −1.0, 0.0)
  - Index 2 for the planes (0.0, 0.0, 1.0) and (0.0, 0.0, −1.0).

2D bounding box (u0, v0, u1, v1)
3D location (x0, y0, z0) of the patch represented in terms of depth δ0, tangential shift s0 and bi-tangential shift r0. According to the chosen projection planes, (δ0, s0, r0) are computed as follows:
   Index 0, δ0=x0, s0=z0 and r0=y0
   Index 1, δ0=y0, s0=z0 and r0=x0
   Index 2, δ0=z0, s0=x0 and r0=y0

Also, mapping information providing for each T×T block its associated patch index is encoded as follows:
   For each T×T block, let L be the ordered list of the indexes of the patches such that their 2D bounding box contains that block. The order in the list is the same as the order used to encode the 2D bounding boxes. L is called the list of candidate patches.
   The empty space between patches is considered as a patch and is assigned the special index 0, which is added to the candidate patches list of all the blocks.
   Let I be index of the patch to which the current T×T block belongs and let J be the position of I in L. Instead of explicitly encoding the index I, its position J is arithmetically encoded instead, which leads to better compression efficiency.

Occupancy map (OM) coding—lossy condition. A two-dimensional binary image of resolution (Width/B0)×(Height/B1), where Width and Height are the width and height of the geometry and texture images that are to be compressed. A sample equal to 1 means that the corresponding/co-located sample or samples in the geometry and texture image may be considered as point cloud points when decoding, while a sample equal to 0 may be ignored (commonly includes padding information). The resolution of the occupancy map does not have to be the same as those of the geometry and texture images and instead the occupancy map could be encoded with a precision of B0×B1 blocks. In order to achieve lossless encoding B0 and B1 are selected to be equal to 1. In practice, B0=B1=2 or B0=B1=4 may result in visually acceptable results, while significantly reducing the number of bits required to encode the occupancy map. The generated binary image covers only a single color plane. However, given the prevalence of 4:2:0 codecs, it may be desirable to extend the image with "neutral" or fixed value chroma planes (e.g. add chroma planes with all sample values equal to 0 or 128, assuming the use of an 8-bit codec).

The obtained video frame is compressed by using a video codec with lossless coding tool support (e.g., AVC, HEVC RExt, HEVC-SCC).

The occupancy map is simplified by detecting empty and non-empty blocks of resolution T×T in the occupancy map and, for the non-empty blocks, their patch index is encoded as follows:
   A list of candidate patches is created for each T×T block by considering all the patches that contain that block.
   The list of candidates is sorted in the reverse order of the patches.
   For each block,
      1. If the list of candidates has one index, then nothing is encoded.
      2. Otherwise, the index of the patch in this list is arithmetically encoded.

Geometry reconstruction. The point cloud geometry reconstruction process exploits the occupancy map information in order to detect the non-empty pixels in the geometry/texture images/layers. The 3D positions of the points associated with those pixels are computed by levering the auxiliary patch information and the geometry images. More precisely, let P be the point associated with the pixel (u, v) and let (δ0, s0, r0) be the 3D location of the patch to which it belongs and (u0, v0, u1, v1) its 2D bounding box. P could be expressed in terms of depth δ(u, v), tangential shift s(u, v) and bi-tangential shift r(u, v) as follows:

$$\delta(u,v)=\delta 0+g(u,v)$$

$$s(u,v)=s0-u0+u$$

$$r(u,v)=r0-v0+v$$

where g(u, v) is the luma component of the geometry image.

Smoothing. The smoothing procedure aims at alleviating potential discontinuities that may arise at the patch boundaries due to compression artefacts. The implemented approach moves boundary points to the centroid of their nearest neighbors.

Texture reconstruction. The texture values are directly read from the texture images.

V-PCC Auxiliary information bit stream syntax (MPEG N18180). The following bit stream syntax is taken from ISO/IEC 23090-5:2018(E) Study of CD, available as MPEG document N18180. Only elements relevant to the examples described herein are selected. Semantics for each syntax element are available in N18180, however, they are not necessary for understanding the examples described herein.

7.3.3.4 Geometry Information Syntax

| geometry_information( ) { | Descriptor |
|---|---|
| gi_geometry_codec_id | u(8) |
| gi_geometry_nominal_2d_bitdepth_minus1 | u(5) |
| gi_geometry_3d_coordinates_bitdepth_minus1 | u(5) |
| if( sps_pcm_separate_video_present_flag ) | |
| gi_pcm_geometry_codec_id | u(8) |
| gi_geometry_params_enabled_flag | u(1) |
| gi_geometry_patch_params_enabled_flag | u(1) |
| } | |

Syntax and semantics for SEI message payloads may be specified. SEI messages assist in processes related to decoding, reconstruction, display, or other purposes. However, SEI messages are not required by the decoding process. Conforming decoders are not required to process this information for output order conformance to a particular specification. Some SEI message information is required to check bitstream conformance and for output timing decoder conformance.

Regarding SEI payload syntax, the general SEI message syntax is as follows.

| sei_payload( payloadType, payloadSize ) { | Descriptor |
|---|---|
| if( psd_unit_type = = PSD_PREFIX_SEI ) { | |
| if( /* payload type*/) | |
| /* sei_structur(pyloadSize) */ | |
| else | |
| reserved_sei_message( payloadSize ) | |
| } | |
| else { /* psd_unit_type = = PSD_SUFFIX_SEI */ | |
| if( payloadType = = /* payload type*/ ) | |
| /* sei_structur(pyloadSize) */ | |
| else | |
| reserved_sei_message( payloadSize ) | |
| } | |

-continued

| sei_payload( payloadType, payloadSize ) { | Descriptor |
|---|---|
| if( more_data_in_payload( ) ) {<br>  if( payload_extension_present( ) )<br>    sp_reserved_payload_etension_data<br>  byte_alignment( )<br>  }<br>} | u(v) |

The input to a V-PCC encoder is a point cloud frame that is represented by a number of points in a first coordinate domain (model domain). A V-PCC encoder is converting the point cloud frame to be in another integer coordinate domain (video-based point cloud compression domain, vpcc domain). The conversion is done by bounding an object represented by the point cloud frame by a volume (quantization volume). Then, the object is quantized based on a chosen bit depth, and the bit depth is signaled the in gi_geometry_3d_coordinates_bitdepth_minus1 field in the VPCC bitstream. For example, this could be 10 bits, i.e. 1024 by 1024 by 1024 points.

First problem: VPCC bitstream does not provide information to a decoder how to convert back from vpcc domain (video-based point cloud compression domain) to model domain.

An object or group of objects represented by the point cloud frame in model domain may be placed in respect to yet another coordinate domain (world domain). For example, when model domain origin changes in world domain on a frame to frame basis an effect of animation could be achieved.

In the current V-PCC specification, when there is a number of point cloud frames that constitute to a point cloud sequence the origin of the model domain is the same as world domain for all frames. In other words, quantization volume is the same for all frames and is static in world domain. The V-PCC encoder may calculate quantization volume based on the first frame of a sequence or based on number or frames of a sequence. In the former, the resolution of the point cloud frame may be possibly the highest, but it may happen that an object is outside of the quantization volume in some of point cloud frames in model domain. In the latter, the V-PCC encoder may ensure that the object represented by point cloud frame in real domain is always represented by point cloud frame in model domain by the expense of the resolution of the object. In order to solve the problems presented above the V-PCC encoder should adapt the origin of the model domain in respect of world domain on a frame to frame basis.

Second problem: V-PCC does not provide possibility to adapt quantization volume on a frame to frame basis.

After decoding a point cloud frame an application may likely place it in a scene (AR or VR). A rendering engine of the application may likely need to transform the point cloud frame in accordance to external information (e.g. change of point of view of the camera due to VR headset movement). To perform such operation a renderer needs to know in respect to which point (pivot point) the transformation may be executed.

Third problem: V-PCC specification does not provide information about the pivot point of the object or group of objects represented by the point cloud frame.

In order to ensure the immersive experience in an AR application, a decoded point cloud frame place in a scene should maintain the real dimensions of the represented object.

Fourth problem: V-PCC specification does not provide information how to convert the decoded point cloud frames in encoder domain back in the real-world domain, so the scale of the object is preserved.

The scaling related information of the examples described herein solve the above-mentioned problems.

A similar but simplified version of the signaling described herein was presented by the inventors of the examples described herein in the contribution "Model scale and offset signaling for PCC" m42470, April 2018, San Diego, USA.

In the examples described herein, signaling information about vpcc to model to world domain conversion is introduced to increase the encoding performance and maintain the highest possible fidelity of the decoded point cloud. Additionally, the signaling allows a content creator to enclose information in a VPCC bitstream that ensures a decoded object is reproduced in line with the content creator's intention and as well it may be re-used in a number of scenes. Accordingly, the examples described herein accomplish the following objectives.

1. Define signaling information about model to world conversion.
  a. signal a pivot point of an object or group of objects represented by the point cloud frame in video-based point cloud compression domain (vpcc domain)
  b. signal a scale parameter that scales an object or group of objects represented by the point cloud frame from vpcc to model domain
  c. signal a rotation parameter that rotates, around the signaled pivot point, an object or group of objects represented by the point cloud frame to be correctly oriented in world domain
  d. signal a translation parameter that translates, in respect to the signaled pivot point, an object or group of objects represented by the point cloud frame to be correctly placed in world domain
2. Define signaling information about world domain
  e. signal a unit of length in world domain
  f. signal a co-ordinate system of the world domain
  g. signal a dimension of the bounding box in the world domain in which an object or a group of objects represented by the point cloud frames in a sequence are placed around
  h. signal a pivot point of the bounding box in the world domain
3. Introduce a new V-PCC encoder and decoder operation based on the proposed signaling Benefits. The examples described herein provide several benefits and technical effects. Among these benefits and technical effects include i) an encoder that implements a pre-processing algorithm that improves the compression efficiency, ii) a content creator that provides information about scale and real dimensions, iii) world coordinate domain dimensions of the object may be preserved, and iv) multiple point cloud model(s) may be incorporated into the same scene.

In the described examples, new signaling structures are introduced to the V-PCC SEI signaling. High-level block diagrams for the encoder and decoder of the described examples are depicted in FIG. 8 and FIG. 9, respectively.

Figure 8:
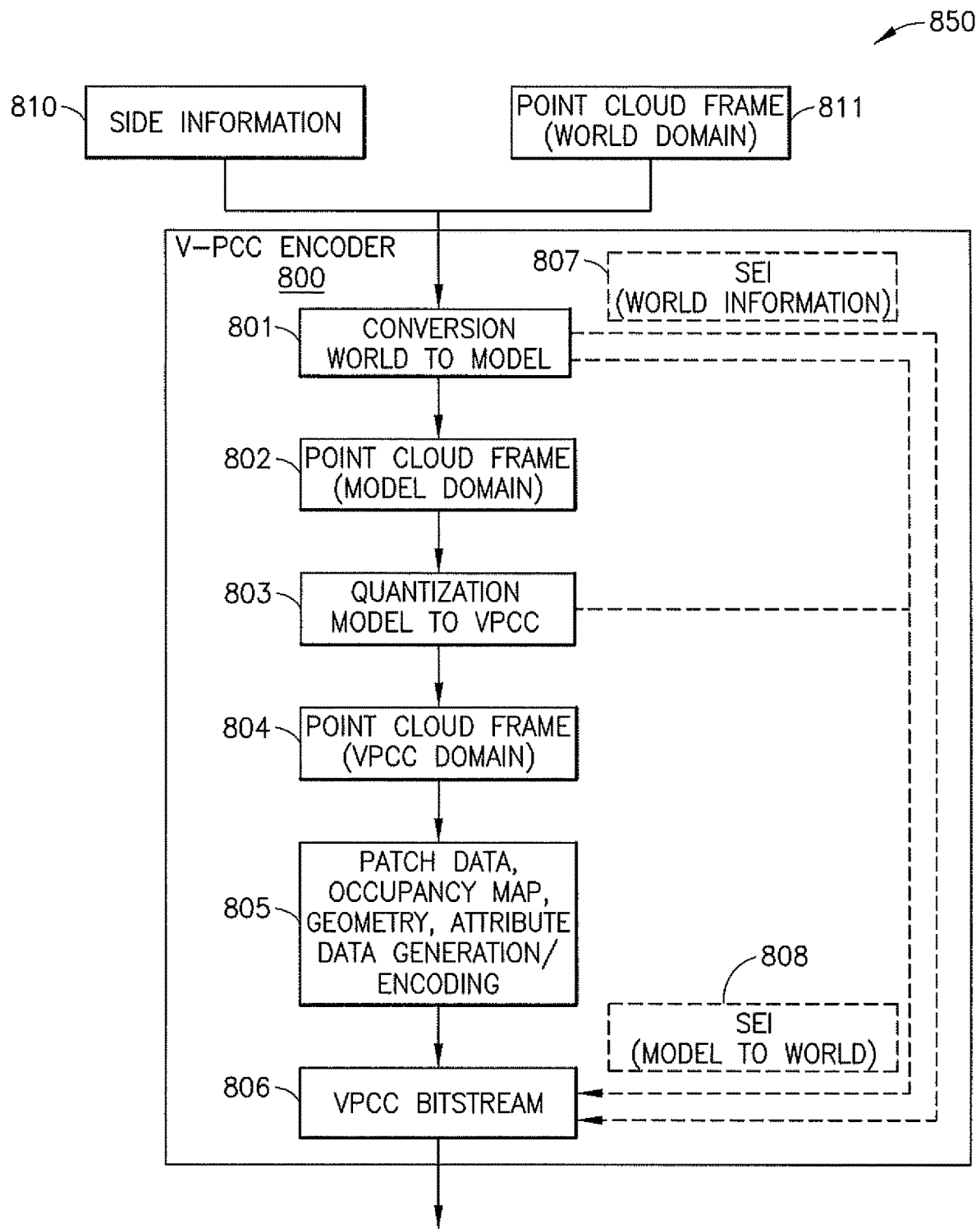
FIG. 8 shows an example V-PCC encoder operation.

FIG. 8 shows an example V-PCC encoder operation 850 of an example V-PCC encoder 800. Operation of the V-PCC encoder 800 may be as follows: A point cloud frame in a world domain (811) together with side information (810) is provided as input to the V-PCC encoder (800). A side information module (810) may provide, including but not limited to, information about unit of length of the world domain, a bounding box of the object or group of objects represented by the sequence of point cloud frames in world domain, a pivot point of the bounding box, and world domain coordinate system axes. Conversion (801) performs conversion of a point cloud frame in world domain (811) to point cloud frame in model domain (802) and generates SEI messages (807, 808). Conversion module (801) may utilize the information provided by side information (810) or it may perform the calculation to obtain necessary information, including but not limited to, translation, rotation, and pivot point. Conversion module (801) operates on a frame to frame basis and it may find the most appropriate representation of an object or group of objects represented by point cloud frame (802) within model domain. Point cloud frame in model domain (802) is provided to quantization module (803) that converts the point cloud frame in model domain (802) to point cloud frame in video-based point cloud compression domain (vpcc domain) (804). The quantization module (803) provides information how to scale back from vpcc domain to model domain. This information is included in SEI message model to world (808). Point cloud frame in vpcc domain (804) is input to patch data, occupancy map, geometry, attribute generation/encoding module (805). The generation/encoding module (805) operates according to V-PCC specification and chosen profile, tier, level parameters of VPCC bitstream (806). The output of V-PCC encoder (800) is a VPCC bitstream (806) that contains SEI messages (e.g. 807, 808 or other one or more SEI messages).

Figure 9:
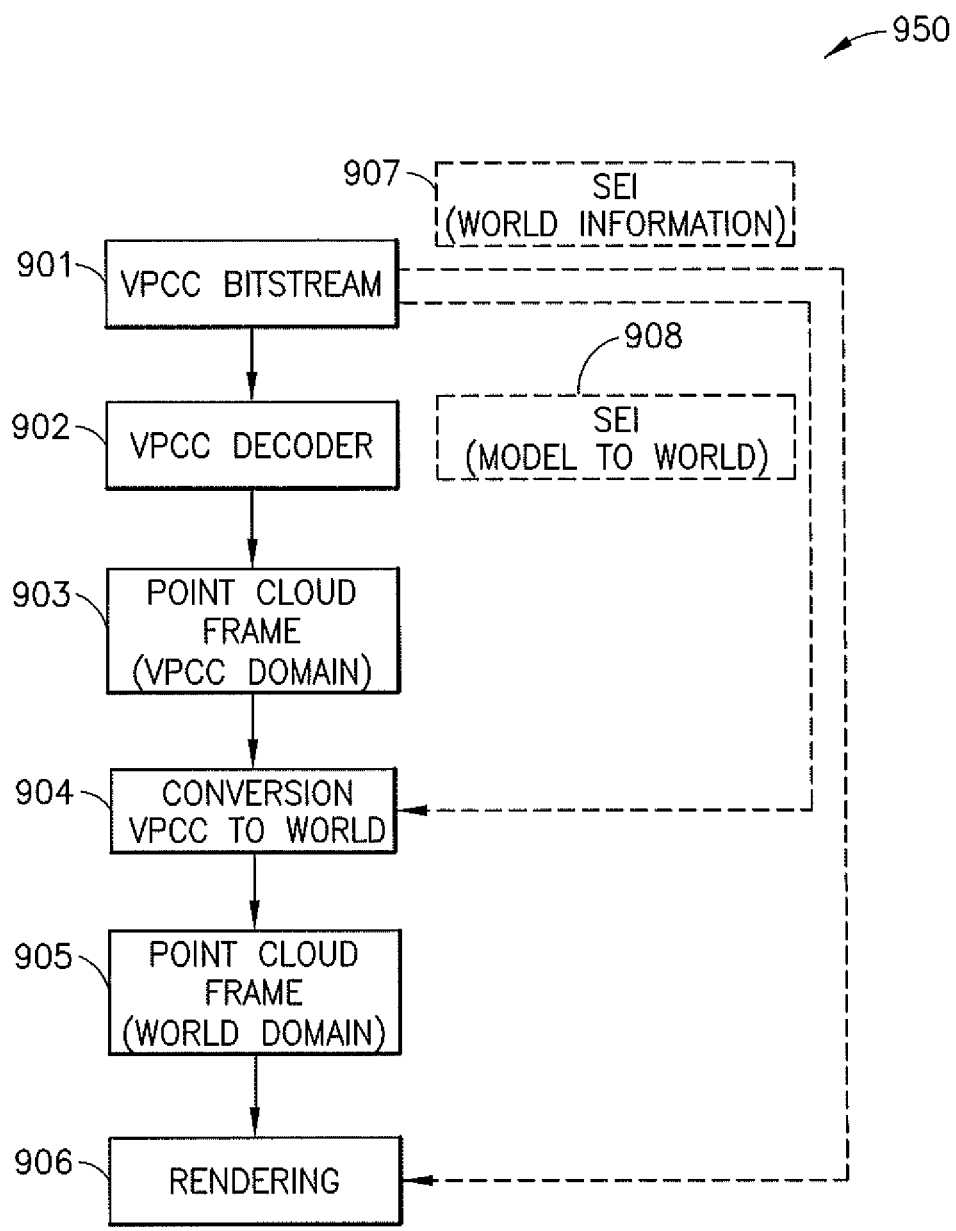
FIG. 9 shows an example V-PCC decoder operation.

FIG. 9 shows an example V-PCC decoder operation 950. Operation of the V-PCC decoder may be as follows: VPCC bitstream (901), containing SEI messages (907, 908), is provided as input to V-PCC decoder (902). V-PCC decoder (902) operates according to V-PCC specification and generates a point cloud frame in vpcc domain (903). A conversion module (904) performs conversion of point cloud frame in vpcc domain (903) to a point cloud frame in world domain (905) based on the information signaled by SEI message (908). A conversion module (904) may have an intermediate state where point cloud frame in vpcc domain (903) is firstly transformed to point cloud frame in model domain and then the point cloud frame in model domain is transformed to point cloud frame in world domain (905). A paint cloud frame in world domain (905) together with information signaled by SEI message (907) is provided to rendering module (906). The rendering module (906) may render the point cloud frame in world domain (905) with proper scale, orientation and translation. In a practical implementation, some of the blocks (904, 905, 906) may reside in the application, with the PCC decoder only providing the decoded video and the metadata.

The SEI message (808, 908) structure contains information that allows conversion (904) of a point cloud in vpcc domain (804, 903) to point cloud in world domain (811, 905).

| model_to_world ( payloadSize ) { | Descriptor |
|---|---|
| precision_minus3 | u(2) |
| translation_flag | u(1) |
| rotation_flag | u(1) |
| scale_flag | u(1) |
| pivot | u(2) |
| reserved | u(1) |
| if( translation_flag == 1 ) { | |
|   translation_x | u(v) |
|   translation_y | u(v) |
|   translation_z | u(v) |

| model_to_world ( payloadSize ) { | Descriptor |
|---|---|
| } | |
| if( rotation_flag == 1 ) { | |
|   rotation_x | i(v) |
|   rotation_y | i(v) |
|   rotation_z | i(v) |
| } | |
| if( scale_flag ==1 ) { | |
|   scale | u(v) |
| } | |
| if( pivot == 3 ) { | |
|   pivot_x | u(v) |
|   pivot_y | u(v) |
|   pivot_z | u(v) |
| } | |
| } | |

This SEI message (808 or 908) provides information about how to transform the reconstructed point cloud frame from decoder integer domain to the world domain starting with the current access unit. If applied, the transformation may be performed in the following order: scale, rotation and translation. The rotation and translation may be performed in respect to the indicated pivot point.

The message remains effective until the next SEI message of the same type or the end of the vpcc sequence, whichever is earlier in decoding order.

precision_minus3 indicates a value used to calculate the number of bits used for the translation (x, y, z), rotation (x, y, z), scale, and pivot (x, y, z) fields.

translation_flag indicates whether translation information is signaled or not. translation_flag equal to 1 indicates e.g. that translation information is signaled. translation_flag equal to 0 indicates e.g. that translation information is not signaled.

rotation_flag indicates whether rotation information is signaled or not. rotation_flag equal to 1 indicates e.g. that rotation information is signaled. rotation_flag equal to 0 indicates e.g. that rotation information is not signaled.

scale_flag indicates whether scale information is signaled or not. scale_flag equal to 1 indicates e.g. that scale information is signaled. scale_flag equal to 0 indicates e.g. that scale information is not signaled.

pivot indicates the position of the pivot point.

TABLE Y

Specification of pivot

| pivot | description |
|---|---|
| 0 | center of bounding box (quantization volume) |
| 1 | origin of point cloud coordinate system |
| 2 | reserved |
| 3 | explicit signaling in respect to the origin of the bounding box | translation_x, translation_y, translation_z indicate the translation along the x-, y- and z-axis, respectively. The values of translation_x, translation_y, and translation_z are stored as fixed-point values (see Table X). The number of bits used to represent translation_x, translation_y, translation_z is equal to $2^{precision\_minus3+3}$.

rotation_x, rotation_y, rotation_z indicate the geometry rotation quaternion. The fourth component of the quaternion may be calculated by the equation: $rotation\_x^2 + rotation\_y^2 + rotation\_z^2 + rotation\_w^2 = 1.0$. The values of rotation_x, rotation_y, and rotation_x are stored as fixed-point values (see Table X). The number of bits used to represent rotation_x, rotation_y, and rotation_z is equal to $2^{precision\_minus3+3}$.

scale indicates the uniform scaling of the object. The value of scale is stored as a fixed-point value (see Table X). The number of bits used to represent scale is equal to $2^{precision\_minus3+3}$.

pivot_x, pivot_y, pivot_z indicate the pivot position in respect to the origin of the coordinate system. The values of pivot_x, pivot_y, and pivot_z are stored as fixed-point values (see Table X). The number of bits used to represent pivot_x, pivot_y, pivot_z is equal to $2^{precision\_minus3+3}$.

Table X provides example values of the aforementioned fixed point values.

TABLE X fix-point numbers representation based on the precision_minus3 value

| precision_minus3 | 0 | 1 | 2 | 3 |
|---|---|---|---|---|
| translation_x, translation_y, translation_z | 4.4 | 8.8 | 16.16 | 32.32 |
| rotation_x, rotation_y, rotation_z | 2.6 | 2.14 | 2.30 | 2.62 |
| scale | 4.4 | 8.8 | 16.16 | 32.32 |
| pivot_x, pivot_y, pivot_z | 4.4 | 8.8 | 16.16 | 32.32 |

Fixed-point numbers are signed or unsigned values resulting from dividing an integer by an appropriate power of 2. For example: a 30.2 fixed-point number is formed by dividing a 32-bit integer by $2^2$; a 16.16 fixed-point number is formed by dividing a 32-bit integer by $2^{16}$; a 2.6 fixed-point number is formed by dividing a 8-bit integer by $2^6$.

SEI message (e.g. 807, 907) signaling information about world domain may be utilized by a rendering module (906).

| world_information ( payloadSize ) { | Descriptor |
|---|---|
| unit_of_length_flag | u(1) |
| world_orientation | u(1) |
| volume_present_flag | u(1) |
| pivot | u(1) |
| reserved | u(4) |
| if(world_orientation == 1) { | |
|   up_x | i(64) |
|   up_y | i(64) |
|   up_z | i(64) |
|   front_x | i(64) |
|   front_y | i(64) |
|   front_z | i(64) |
| } | |
| if(volume_flag == 1) { | |
|   volume_x | u(64) |
|   volume_y | u(64) |
|   volume_z | u(64) |
| } | |
| if( pivot == 1) { | |
|   pivot_x | u(128) |
|   pivot_y | u(128) |
|   pivot_z | u(128) |
| } | |
| } | |

This SEI message (e.g. 807, 907) provides information about the world domain. The message remains effective until the next SEI message of the same type or the end of the vpcc sequence, whichever is earlier in decoding order.

When volume_present_flag equals to 1, a pivot point of the world may be the center of the volume. Otherwise the origin of the coordinate system may be used as a pivot point.

unit_of_length_flag indicates the type of unit of length defined. unit_of_length_flag equal to 1 indicates the unit of length is meter. unit_of_length_flag equal to 0 indicates the unit of length is arbitrary.

world_orientation indicates the used world orientation. world_orientation equal to 0 indicates orientation is as defined in ISO/IEC 23090-2. world_orientation equal to 1 indicates that the orientation is specified by unit up vector (up_x, up_y, up_z) and unit front vector (front_x, front_y, front_z). The specified coordinate system in ISO/IEC 23090-2 is the same as in ISO/IEC 23008-3.

volume_present_flag indicates whether volume information is signaled or not.

up_x, up_y, up_z indicates a unit vector that describes the up direction in the right handed coordinate system. The values of up_x, up_y, and up_z are stored as 32.32 fixed-point values.

front_x, front_y, front_z indicate a unit vector that describes the front direction in the right handed coordinate system. The values of front_x, front_y, and front_z are stored as 32.32 fixed-point values.

volume_x, volume_y, volume_z indicate volume dimension along the x axis, y axis, and z axis, respectively. The values of volume_x, volume_y, and volume_z are stored as 32.32 fixed-point values.

pivot indicates the position of the pivot point in world domain.

TABLE Y

Specification of pivot

| pivot | description |
|---|---|
| 0 | origin of point cloud coordinate system |
| 1 | explicit signaling in respect to the origin of the bounding box | pivot_x, pivot_y, pivot_z indicate the pivot position in respect to the origin of the coordinate system. The values of pivot_x, pivot_y, and pivot_z are stored as 64.64 fixed-point values.

Additional embodiments: In another embodiment information of SEI messages (807, 808, 907, 908) are not delivered within VPCC bitstream (806, 901) but they are conveyed equivalently by other means (e.g. as a timed metadata track associated with VPCC track within ISOBMFF).

Additional embodiments: In another embodiment information of SEI messages (807, 808, 907, 908) are delivered by other structures within VPCC bitstream (806, 901) (e.g. as part of a sequence parameter set or frame parameter set).

Additional embodiments: In another embodiment conversion module (801) is not a part of the VPCC encoder (800) but it is a standalone pre-processing module, that provides equivalent information to VPCC encoder (800).

Additional embodiments: In another embodiment, the unit of length could be signaled depending on the value of unit_of_length_flag. For example, if unit_of_length==0, a fixed point scale value may follow that explicitly gives the length of one unit, or a signed power value that may be used to derive the unit of length.

Additional embodiments: In another embodiment, the pivot field may have more bits dedicated to another indicated pre-defined field, e.g. the center of the floor plane of the bounding box.

The examples described herein may be contributed to standardization, such as standardization in MPEG-I 23090 Part 5—Video-based Point Cloud Compression.

Structures and concepts described herein may be included as normative text in a standard and as such any product claiming conformance may be considered as an adopter.

Figure 10:
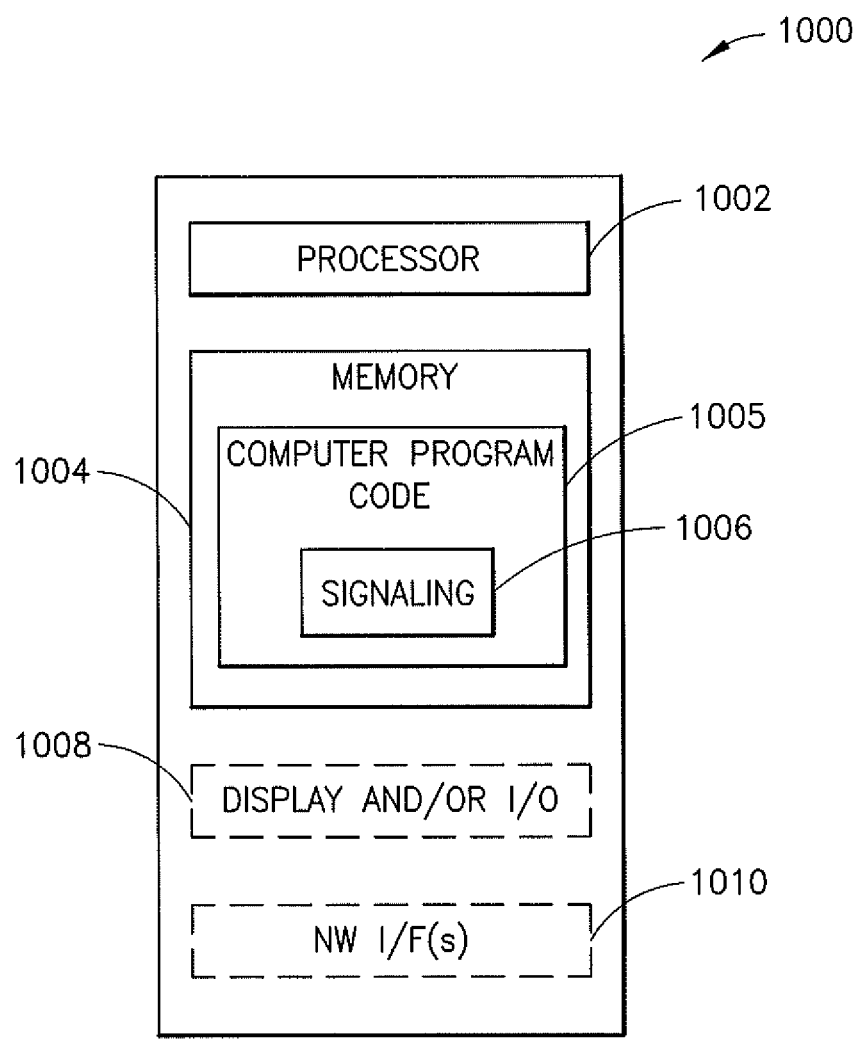
FIG. 10 is an example apparatus configured to implement video-based cloud compression model to world signaling, based on the examples described herein.

FIG. 10 is an example apparatus 1000, which may be implemented in hardware, configured to implement video-based cloud compression model to world signaling, based on the examples described herein. The apparatus 1000 comprises a processor 1002, at least one non-transitory memory 1004 including computer program code 1005, wherein the at least one memory 1004 and the computer program code 1005 are configured to, with the at least one processor 1002, cause the apparatus to implement circuitry, a process, component, module, or function (collectively 1006) to implement the signaling as described herein. The apparatus 1000 optionally includes a display and/or I/O interface 1008 that may be used to display aspects or a status of the methods described herein (e.g., as the methods are being performed or at a subsequent time). The display and/or I/O interface 1008 may also be configured to receive input such as user input The apparatus 1000 also optionally includes one or more network (NW) interfaces (I/F(s)) 1010. The NW I/F(s) 1010 may be wired and/or wireless and communicate over the Internet/other network(s) via any communication technique. The NW I/F(s) 1010 may comprise one or more transmitters and one or more receivers. The apparatus 1000 may be configured as a server or client based on the signaling aspects described herein (for example, apparatus 1000 may be a remote, virtual or cloud apparatus).

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory 1004 may be implemented using any suitable data storage technology, such as semiconductor based memory devices, flash memory, magnetic memory devices and systems, optical memory devices and systems, fixed memory and removable memory. The memory 1004 may comprise a database for storing data.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

Figure 11:
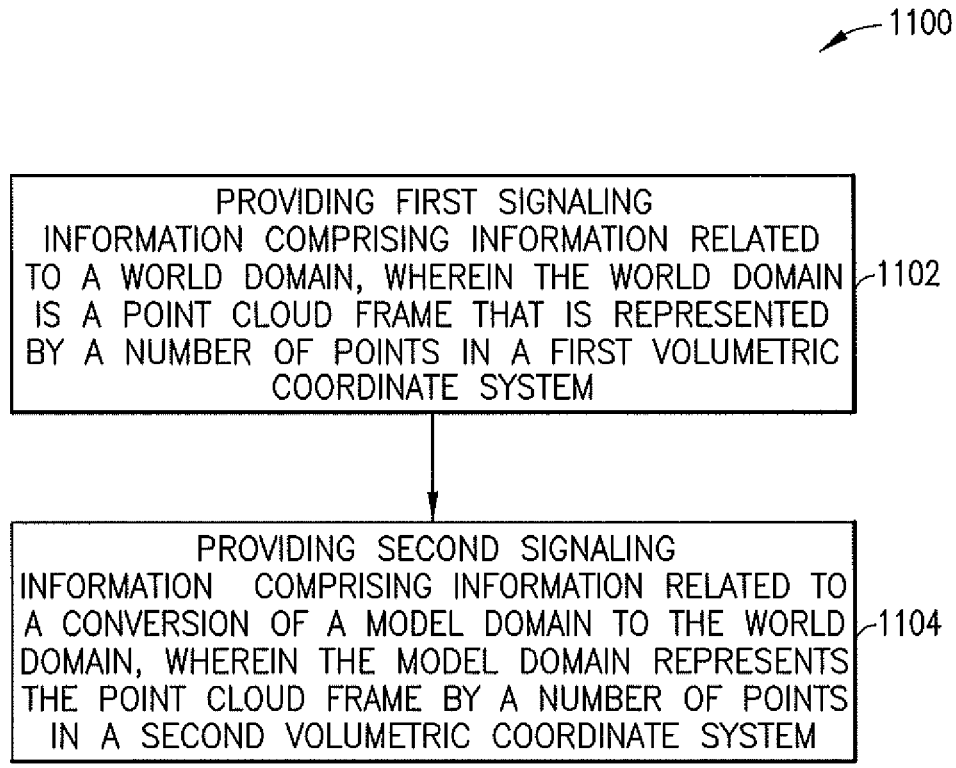
FIG. 11 is an example method to implement video-based cloud compression model to world signaling, based on the examples described herein.

FIG. 11 is an example method 1100 that implements six degrees of freedom spatial layout signaling based on the examples described herein. At 1102, the method includes providing first signaling information comprising information related to a world domain, wherein the world domain is a point cloud frame that is represented by a number of points in a first volumetric coordinate system. At 1104, the method includes providing second signaling information comprising information related to a conversion of a model domain to the world domain, wherein the model domain represents the point cloud frame by a number of points in a second volumetric coordinate system.

An example apparatus includes at least one processor; and at least one non-transitory memory including computer program code; wherein the at least one memory and the computer program code are configured to, with the at least one processor, cause the apparatus at least to perform: provide first signaling information comprising information related to a world domain, wherein the world domain is a point cloud frame that is represented by a number of points in a first volumetric coordinate system; and provide second signaling information comprising information related to a conversion of a model domain to the world domain, wherein the model domain represents the point cloud frame by a number of points in a second volumetric coordinate system.

The apparatus may further include wherein the at least one memory and the computer program code are further configured to, with the at least one processor, cause the apparatus at least to perform: signal one or more camera parameters of an adaptation parameter set that extend the point cloud frame.

The apparatus may further include wherein the at least one memory and the computer program code are further configured to, with the at least one processor, cause the apparatus at least to perform: signal the presence of the one or more camera parameters or lack thereof.

The apparatus may further include wherein the one or more camera parameters are related to at least one of scale, offset, or rotation, and are used for reconstruction following a decoding operation.

The apparatus may further include wherein the at least one memory and the computer program code are further configured to, with the at least one processor, cause the apparatus at least to perform: signal one or more volumetric usability parameters of a sequence parameter set.

The apparatus may further include wherein the volumetric usability parameters comprise one or more of: an indication of the one or more volumetric usability parameters being represented in meters; an indication of a presence of display box information or lack thereof; or an indication of the presence of an anchor point or lack thereof.

The apparatus may further include wherein the at least one memory and the computer program code are further configured to, with the at least one processor, cause the apparatus at least to perform: an adaptation that generates a set of points in a reconstruction of the point cloud frame.

The apparatus may further include wherein the adaptation uses as input: a number of point of the point cloud frame; an array of the positions of points in the point cloud frame; an anchor point; and at least one of an offset matrix, a rotation matrix, or a scale matrix.

The apparatus may further include wherein the at least one memory and the computer program code are further configured to, with the at least one processor, cause the apparatus at least to perform: perform at least one of an operation of a video-based point cloud coding encoder or an operation of a video-based point cloud coding decoder based on the provided first signaling and provided second signaling.

The apparatus may further include wherein the at least one memory and the computer program code are further configured to, with the at least one processor, cause the apparatus at least to perform at least one of: encode the point cloud frame in the world domain into a video-based point cloud bitstream using the video-based point cloud coding encoder; or decode the video-based point cloud bitstream to render the point cloud frame in the world domain using the video-based point cloud coding decoder.

The apparatus may further include wherein the first signaling information and the second signaling information are generated as a result of a conversion of the point cloud frame in the world domain to the point cloud frame in the model domain.

The apparatus may further include wherein the conversion of the point cloud frame in the world domain to the point cloud frame in the model domain determines a representation of an object or group of objects represented by the point cloud frame in the model domain.

The apparatus may further include wherein a rendering of the point cloud frame in the world domain is based on the first signaling information.

The apparatus may further include wherein a conversion of the point cloud frame in a video-based point cloud compression domain to the point cloud frame in the world domain is based on the second signaling information.

The apparatus may further include wherein the conversion of the point cloud frame in the video-based point cloud compression domain to the point cloud frame in the world domain comprises an intermediate state where the point cloud frame in the video-based point cloud compression domain is firstly transformed to the point cloud frame in the model domain, and then the point cloud frame in the model domain is transformed to the point cloud frame in world domain.

The apparatus may further include wherein the first signaling information comprising information related to the world domain signals one or more of: a signal unit of length in the world domain; a coordinate system of the world domain; a dimension of a bounding box in the world domain in which an object or group of objects represented by a sequence of a plurality of point cloud frames are placed around; or a pivot point of the bounding box in the world domain.

The apparatus may further include wherein the second signaling information comprising information related to the conversion of the model domain to the world domain signals one or more of: a pivot point of an object or group of objects represented by the point cloud frame in a video-based point cloud compression domain; a scale parameter that scales an object or group of objects represented by the point cloud frame from the video-based point cloud compression domain to the world domain; a rotation parameter that rotates, around the signaled pivot point, an object or group of objects represented by the point cloud frame to be correctly oriented in the world domain; or a translation parameter that translates, in respect to the signaled pivot point, an object or group of objects represented by the point cloud frame to be correctly placed in the world domain.

An example method includes providing first signaling information comprising information related to a world domain, wherein the world domain is a point cloud frame that is represented by a number of points in a first volumetric coordinate system; and providing second signaling information comprising information related to a conversion of a model domain to the world domain, wherein the model domain represents the point cloud frame by a number of points in a second volumetric coordinate system.

The method may further include signaling one or more camera parameters of an adaptation parameter set that extend the point cloud frame; signaling one or more volumetric usability parameters of a sequence parameter set; and performing an adaptation that generates a set of points in a reconstruction of the point cloud frame.

An example non-transitory program storage device readable by a machine, tangibly embodying a program of instructions executable by the machine for performing operations may be provided, the operations comprising: providing first signaling information comprising information related to a world domain, wherein the world domain is a point cloud frame that is represented by a number of points in a first volumetric coordinate system; and providing second signaling information comprising information related to a conversion of a model domain to the world domain, wherein the model domain represents the point cloud frame by a number of points in a second volumetric coordinate system.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:
1. An apparatus comprising:
at least one processor; and
at least one non-transitory memory storing instructions that, when executed by the at least one processor, cause the apparatus at least to:
signal first information comprising information related to a world domain, wherein the world domain is a point cloud frame that is represented with a number of points in a first volumetric coordinate system;
signal second information comprising information related to a conversion of a model domain to the world domain, wherein the model domain represents the point cloud frame with a number of points in a second volumetric coordinate system;
signal one or more camera parameters of an adaptation parameter set that extend the point cloud frame;
signal one or more volumetric usability parameters of a sequence parameter set; and
perform an adaptation that generates a set of points in a reconstruction of the point cloud frame;
wherein the adaptation uses as input:
a number of one or more points of the point cloud frame;
an array of positions of points in the point cloud frame;
an anchor point; and
at least one of an offset matrix, a rotation matrix, or a scale matrix.

2. The apparatus of claim 1, wherein the instructions, when executed by the at least one processor, cause the apparatus at least to:
signal the presence of the one or more camera parameters or lack thereof.

3. The apparatus of claim 1, wherein the one or more camera parameters are related to at least one of scale, offset, or rotation, and are used for reconstruction following a decoding operation.

4. The apparatus of claim 1, wherein the volumetric usability parameters comprise one or more of:
an indication of the one or more volumetric usability parameters being represented in meters;
an indication of a presence of display box information or lack thereof or
an indication of the presence of an anchor point or lack thereof.

5. The apparatus of claim 1, wherein the instructions, when executed by the at least one processor, cause the apparatus at least to:
perform at least one of an operation of a video-based point cloud coding encoder or an operation of a video-based point cloud coding decoder based on the signaled first information and the signaled second information.

6. The method of claim 5, wherein the instructions, when executed by the at least one processor, cause the apparatus at least to perform at least one of:
encode the point cloud frame in the world domain into a video-based point cloud bitstream using the video-based point cloud coding encoder; or
decode the video-based point cloud bitstream to render the point cloud frame in the world domain using the video-based point cloud coding decoder.

7. The apparatus of claim 1, wherein the signaled first information and the signaled second information are generated as a result of a conversion of the point cloud frame in the world domain to the point cloud frame in the model domain.

8. The apparatus of claim 7, wherein the conversion of the point cloud frame in the world domain to the point cloud frame in the model domain determines a representation of an object or group of objects represented with the point cloud frame in the model domain.

9. The apparatus of claim 1, wherein a rendering of the point cloud frame in the world domain is based on the signaled first information.

10. The apparatus of claim 1, wherein a conversion of the point cloud frame in a video-based point cloud compression domain to the point cloud frame in the world domain is based on the signaled second information.

11. The apparatus of claim 10, wherein the conversion of the point cloud frame in the video-based point cloud compression domain to the point cloud frame in the world domain comprises an intermediate state where the point cloud frame in the video-based point cloud compression domain is firstly transformed to the point cloud frame in the model domain, and then the point cloud frame in the model domain is transformed to the point cloud frame in world domain.

12. The apparatus of claim 1, wherein the signaled first information comprising information related to the world domain signals one or more of:
a signal unit of length in the world domain;
a coordinate system of the world domain;
a dimension of a bounding box in the world domain in which an object or group of objects represented with a sequence of a plurality of point cloud frames are placed around; or
a pivot point of the bounding box in the world domain.

13. The apparatus of claim 1, wherein the signaled second information comprising information related to the conversion of the model domain to the world domain signals one or more of:
a pivot point of an object or group of objects represented with the point cloud frame in a video-based point cloud compression domain;
a scale parameter that scales an object or group of objects represented with the point cloud frame from the video-based point cloud compression domain to the world domain;
a rotation parameter that rotates, around the signaled pivot point, an object or group of objects represented with the point cloud frame to be correctly oriented in the world domain; or
a translation parameter that translates, in respect to the signaled pivot point, an object or group of objects represented with the point cloud frame to be correctly placed in the world domain.

14. A method comprising:
signaling first information comprising information related to a world domain, wherein the world domain is a point cloud frame that is represented with a number of points in a first volumetric coordinate system;
signaling second information comprising information related to a conversion of a model domain to the world domain, wherein the model domain represents the point cloud frame with a number of points in a second volumetric coordinate system;
signaling one or more camera parameters of an adaptation parameter set that extend the point cloud frame;
signaling one or more volumetric usability parameters of a sequence parameter set; and
performing an adaptation that generates a set of points in a reconstruction of the point cloud frame;
wherein the adaptation uses as input:
a number of one or more points of the point cloud frame;
an array of positions of points in the point cloud frame;
an anchor point; and
at least one of an offset matrix, a rotation matrix, or a scale matrix.

15. A non-transitory program storage device readable with a machine, tangibly embodying a program of instructions executable with the machine for performing operations, the operations comprising:
causing signaling of first information comprising information related to a world domain, wherein the world domain is a point cloud frame that is represented with a number of points in a first volumetric coordinate system;
causing signaling of second information comprising information related to a conversion of a model domain to the world domain, wherein the model domain represents the point cloud frame with a number of points in a second volumetric coordinate system;
causing signaling one or more camera parameters of an adaptation parameter set that extend the point cloud frame;
causing signaling one or more volumetric usability parameters of a sequence parameter set; and causing performing an adaptation that generates a set of points in a reconstruction of the point cloud frame;
wherein the adaptation uses as input:
  a number of one or more points of the point cloud frame;
  an array of positions of points in the point cloud frame;
  an anchor point; and
  at least one of an offset matrix, a rotation matrix, or a scale matrix.

* * * * *